United States Patent
Przybylski et al.

(10) Patent No.: US 7,007,383 B2
(45) Date of Patent: Mar. 7, 2006

(54) METHODS FOR FORMING DOVETAILS FOR TURBINE BUCKETS

(75) Inventors: Jack Przybylski, Elk Grove Village, IL (US); Christophe J. Day, Chicago, IL (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 10/310,851

(22) Filed: Dec. 6, 2002

(65) Prior Publication Data

US 2004/0107572 A1   Jun. 10, 2004

(51) Int. Cl.
*B21D 53/78* (2006.01)
*B44C 1/22* (2006.01)

(52) U.S. Cl. .................. 29/889.7; 29/557; 416/223 R; 219/69.17; 216/94

(58) Field of Classification Search ............... 29/889.7, 29/557; 416/223 R; 219/69.17; 216/94
See application file for complete search history.

(56) References Cited

U.S. PATENT DOCUMENTS

| 4,623,349 | A | * | 11/1986 | Lord | 623/23.44 |
| 5,092,039 | A | * | 3/1992 | Gaskell | 29/890.142 |
| 6,532,662 | B1 | * | 3/2003 | Kobayashi et al. | 29/898.02 |
| 2003/0196990 | A1 | * | 10/2003 | Arness et al. | 219/69.17 |

* cited by examiner

*Primary Examiner*—Marc Jimenez
(74) *Attorney, Agent, or Firm*—Nixon & Vanderhye P.C.

(57) ABSTRACT

A dovetail preform having linearly extending hooks and slots is finished to provide arcuate slots and hooks for securement of the finished bucket dovetail to a correspondingly-shaped dovetail of a turbine wheel. An electrode having the general configuration of the dovetail with arcuate hooks and slots is provided. After relatively linearly displacing the electrode and preform, disposed in an electrolytic solution, to insert the electrode hooks into the slots of the preform, the electrode and preform are relatively displaced in a direction normal to the direction of the linear slots and hooks of the preform such that metal of the preform is burned to form arcuate finished surfaces along the hooks of the preform. In another embodiment, the electrode has a dovetail configuration as a negative of the finished dovetail for the bucket and passes along an arc of a circle through the linearly extending slots of the preform to form the opposed concave and convex surfaces of the finished bucket dovetail.

10 Claims, 3 Drawing Sheets

METHODS FOR FORMING DOVETAILS FOR TURBINE BUCKETS

BACKGROUND OF THE INVENTION

The present invention relates to methods for forming dovetails on turbine buckets for connection with turbine wheels and particularly relates to electrodischarge machining methods for forming arcuate dovetail configurations along opposite sides of recesses of turbine bucket dovetail preforms, enabling the buckets for securement on correspondingly-shaped wheels of a turbine.

Presently, dovetails are formed on turbine buckets, typically in a casting process or by milling. For example, a three-bar linkage path generator with a single flute end-mill may be used to machine the dovetail to its final dimension. Alternatively, a three-axis CNC milling machine with a rotary table setup may be utilized. Both processes are labor-intensive, require significant operator interaction, and are time-consuming and tedious. In providing turbine buckets, however, the quantity of buckets required and the uniqueness or the style of the buckets ordered dictates a need for a stable predictable process for forming the dovetails. The resulting surface finish and tolerances produced with the current dovetail milling processes are not repeatable or predictable. Accordingly, there is a need for an accurately repeatable predictable process for forming dovetails in turbine buckets in a more efficient manner, with elimination of many of the current tooling preparation steps, as well as reduction in operator interaction and material consumption and scrap, together with increased automation and productivity.

BRIEF DESCRIPTION OF THE INVENTION

In a preferred embodiment of the present invention, there is provided a method of electrodischarge machining dovetails for turbine buckets wherein the dovetail of the bucket is initially provided in a dovetail-shaped preform. That is, the base of the bucket preform includes a recess having an interior surface configuration only generally corresponding to the finished dovetail configuration and in which the preform configuration is in rough, unfinished form. The preform is readily formed by wire electromachining processes and includes generally linearly extending slots and hooks along opposite sides of the recess. The phrase linearly extending means that the slots and hooks of the preform extend in a straight line direction, e.g., tangent to the circumference of the turbine to which the bucket will be secured.

In one embodiment of the present invention, an electrode is provided with hooks and slots extending in an arcuate configuration conforming to the arc of the slots and hooks of a finished bucket dovetail. The hooks and slots of the electrode, however, are formed with clearances such that the electrode may be inserted linearly into the recess of the generally dovetail-shaped preform in a direction parallel to the linearly extending slots and hooks of the preform. Clearances are provided between the hooks of the electrode and the hooks of the dovetail preform enabling the arcuate hooks of the electrode to be received between the linearly extending hooks of the preform. When the electrode is centrally located within the linear slots of the dovetail preform and the electrode and preform are in an electrolyte solution, the electrode and preform are displaced relative to one another in a direction normal to the linearly extending direction of the hooks and slots of the preform, while simultaneously the preform and electrode are maintained in electrical contact with one another. The electrodischarge machining process thus melts, i.e., burns, the metal along the hooks of the preform to conform to the concave and convex surfaces of the electrode, thus forming finished arcuate surfaces on the hooks of the bucket dovetail. The height of the arcuate hooks of the electrode (from each apex to the end edges) is slightly less than the height between adjacent linearly extending hooks of the dovetail preform, enabling insertion of the electrode in a linear direction parallel to the linearly extending slots of the preform.

In another embodiment hereof, the electrode hooks and slots are formed as an exact negative of the hooks and slots of the finished bucket dovetail. By passing the electrode through the linearly extending hooks and slots of the preform and along the arc of a circle having a center corresponding to the arc of a circle defining the convex and concave surfaces of a finished bucket dovetail, the electrodischarge machining forms arcuate hooks and slots in the preform corresponding identically to the dovetail of the finished product.

In a preferred embodiment according to the present invention, there is provided a method of forming a dovetail on a bucket for a turbine comprising the steps of (a) forming linearly extending, generally dovetail-shaped slots and hooks in a recess of a bucket dovetail preform, (b) providing an electrode having arcuate slots and hooks and (c) relatively displacing the electrode and the preform to insert the hooks of the electrode into the slots of the preform and electromachining the preform upon electrical contact between the preform and electrode to provide arcuate-shaped hooks and slots along the bucket dovetail recess.

In a further preferred embodiment according to the present invention, there is provided a method of forming a dovetail on a bucket for a turbine comprising the steps of (a) forming linearly extending, generally dovetail-shaped slots and hooks in a bucket dovetail preform, (b) providing an electrode having an outer surface configuration comprised of arcuate hooks and slots in the form of a generally negative configuration of a finished dovetail on the turbine bucket and (c) relatively displacing the electrode and preform to insert the hooks of the electrode into the slots of the preform and electromachining the preform upon electrical contact between the preform and electrode to provide arcuate surfaces along the hooks on the bucket dovetail preform.

DETAILED DESCRIPTION OF THE INVENTION

Figure 2:
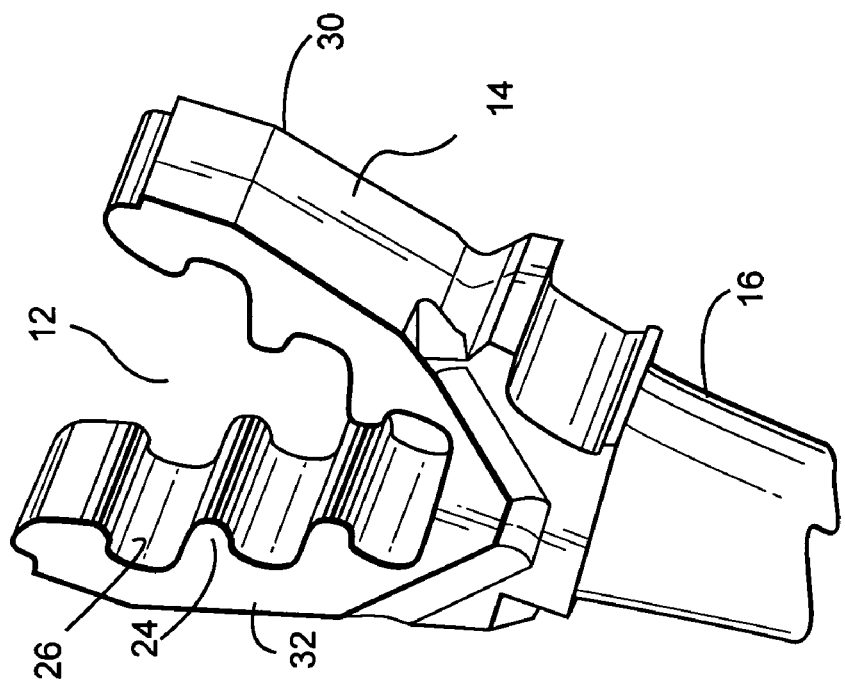
FIG. 2 is a fragmentary perspective view of a bucket illustrating a bucket dovetail with curved hook and slot surfaces.
Figure 1:
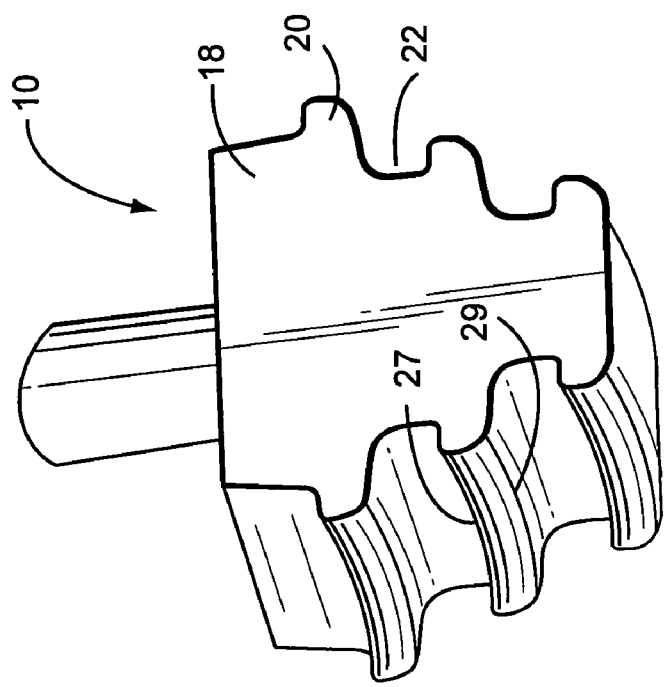
FIG. 1 is a fragmentary perspective view of an electrode forming part of an electromachining apparatus for forming bucket dovetails in accordance with a preferred embodiment of the present invention.
Figure 3:
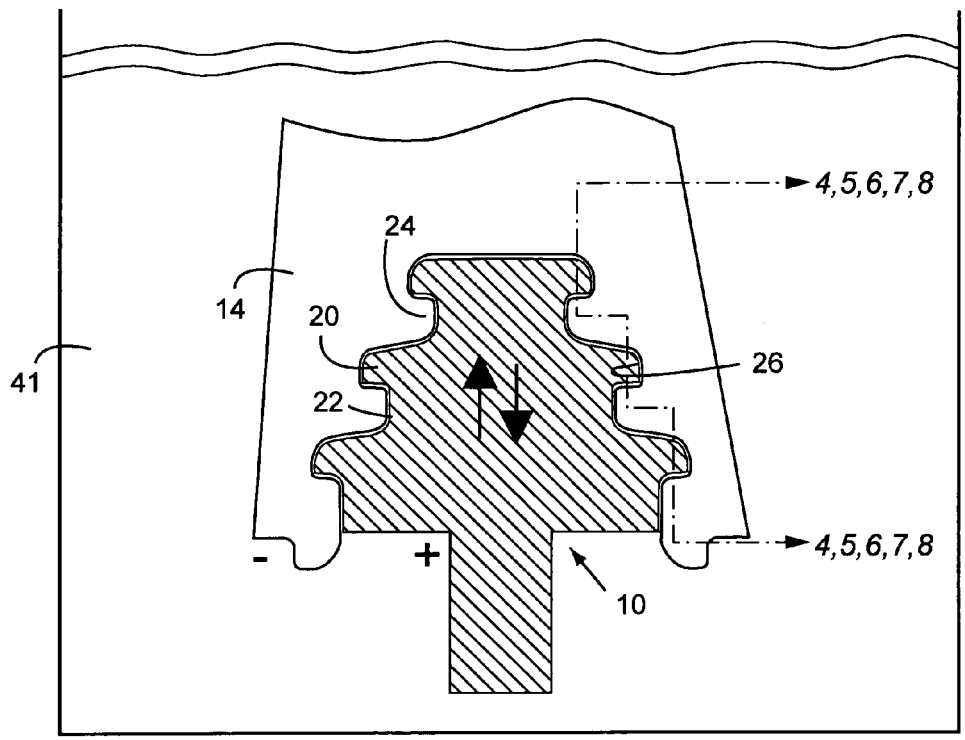
FIG. 3 is a schematic illustration of the tool of FIG. 1 in the preform of a bucket dovetail in an electrolytic bath for electromachining the bucket dovetail.

Referring now to the drawing figures, particularly to FIGS. 1 and 2, there is illustrated a tool comprising an electrode, generally designated 10, forming part of an electromachining apparatus for forming a finished dovetail configuration in a dovetail-shaped recess 12 of a generally dovetail-shaped preform 14. The finished dovetail forms part of a turbine bucket 16. The electrode 10 is preferably formed of graphite material with suitable electrical connections, not shown, for purposes of utilizing the electrode in an electromachining apparatus. The electrode 10 includes a body 18 having a plurality of hooks and slots 20 and 22, respectively, extending arcuately along opposite sides of body 18. Thus, the upper and lower, i.e., opposed, surfaces of the adjacent hooks 20 have concave and convex surfaces extending between the opposite ends or flat sides of the electrode 18.

In FIG. 2, the dovetail recess 12 includes a plurality of hooks and slots 24 and 26 along opposite sides of the recess 12, the hooks and slots essentially being mirror images of one another. The base 30 of the turbine bucket, however, constitutes the preform 14 from which the finished dovetail configuration within the recess 12 is formed by the electromachining process described below. Thus, the hooks and slots 24 and 26, respectively, extend linearly between opposite end faces 32 of the preform 14.

Figures 4, 5, 6:
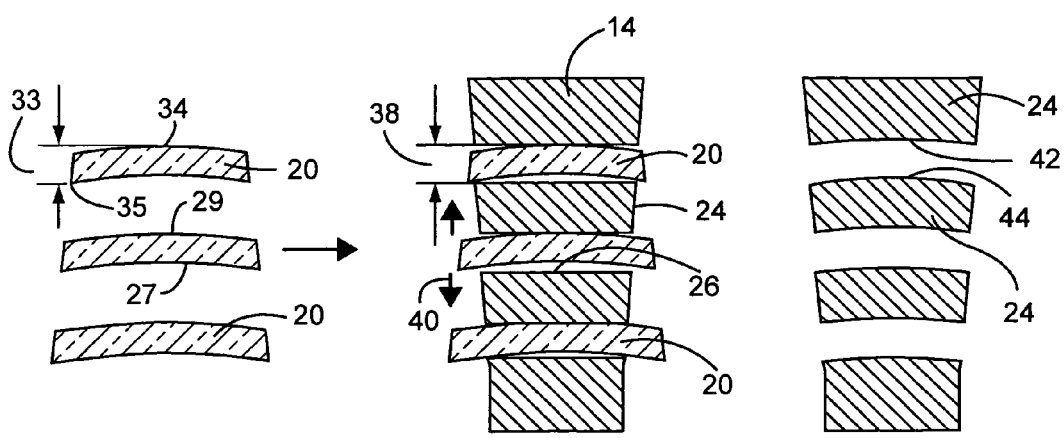
FIG. 4 is a schematic cross-sectional view through the hooks of the electrode along one side thereof taken about on line 4—4 in FIG. 3.
FIG. 5 is a schematic cross-sectional view illustrating the hooks of FIG. 4 in the linearly extending slots of the bucket dovetail preform taken about on line 4—4 in FIG. 5.
FIG. 6 is a schematic cross-sectional view illustrating the curved arcuate surfaces of the slots and hooks of the finished bucket dovetail.

Referring back to FIG. 1 and in a first embodiment hereof, the hooks and slots 20 and 22, respectively, of the electrode 10 are provided with arcuate surfaces, i.e., concave and convex surfaces 27 and 29, respectively, which generally correspond, but with clearances, to the dovetail configuration in a finished bucket. Particularly, the height 33 (FIG. 4) of the hooks 20 between an apex 34 thereof to opposite end edges 35 (FIG. 4) is equal to or less than the height 38 (FIG. 5) of the slots 26 of the preform 14 (FIG. 5). The linearly extending slots 26 of the preform 14 are typically formed by a wire EDM and thus the hooks 24 thereof have generally linearly extending parallel surfaces relative one to the other. Therefore, the general dovetail configuration of the preform 14 must be finished to provide opposite concave and convex surfaces between the hooks 24 to enable the finished bucket dovetail for insertion along the arcuately extending dovetail of a turbine wheel, not shown, into final assembly on the wheel. It will also be appreciated that the linearly extending hooks 24 and slots 26 of the preform 14 extend in a straight line direction which, if applied to the dovetail rim of a turbine wheel, would lie along a tangent to the wheel and in the plane of the wheel.

Referring now to FIGS. 3–6, the preform 14 and the electrode 10 are placed in a bath 41 containing an electrolyte solution and electrically connected to a power source, not shown, for electromachining the surfaces of the dovetail preform to provide the finished surfaces of the bucket dovetail. To accomplish this, the electrode 10 is aligned with and to one side of the recess 12 (FIG. 2) such that upon linear displacement of the electrode 10 toward recess 12, the hooks 20 will pass through the slots 26 of the preform 14, and the slots 22 of the electrode 10 will receive the hooks 24 of preform 14, as illustrated upon consideration of FIGS. 4 and 5. Because the hooks 20 of electrode 10 have a height 33 equal to or less than the height 38 of the slots 26, the electrode 10 passes into the recess 12 with the hooks 20 engaging in slots 26 and the hooks 24 of the preform 30 engaging in the slots 22 of electrode 10. When the electrode 10 is centered vis-à-vis the width of the bucket preform 14, as illustrated in FIG. 5, the bucket preform 14 and electrode 10 are vertically displaced relative to one another, as indicated by the arrows 40 in FIG. 5. Consequently, as the convex upper surfaces 29 of the electrode hooks 20 engage and electromachine the linearly extending upper surface of the bucket preform hooks 24, a concave surface 42 is formed along each of the hooks 24 as illustrated in FIG. 6. Upon relative vertical displacement of the electrode and preform in an opposite direction, the concave surface 27 of the preform hooks 20 engages and electromachines the hooks 24 to form the convex surfaces 44 along the opposing hooks 24. It will be appreciated that the electromachining apparatus thus burns the metal from the opposing surfaces of the hooks 24 to form the respective concave and convex surfaces 42 and 44. Upon withdrawal of the electrode from the preform, it will be appreciated that the arcs of the resulting hooks formed in the preform 14 correspond identically to the necessary arcs of a finished dovetail for disposition on a correspondingly-shaped dovetail of a turbine wheel whereby the turbine bucket can be secured to the wheel.

Figure 7:
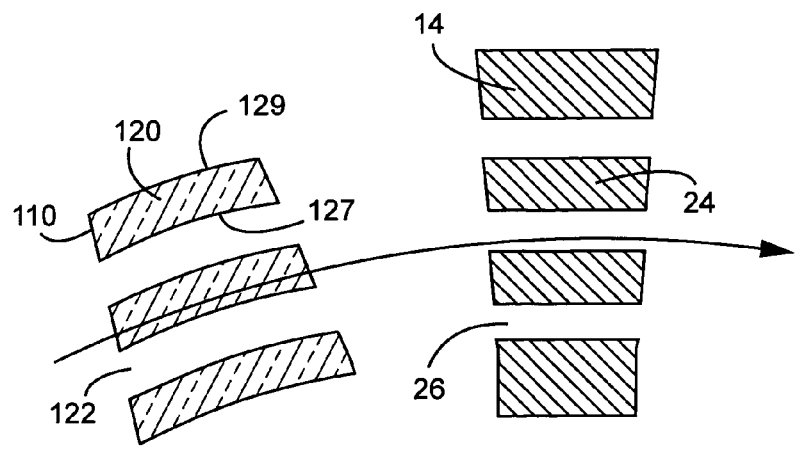
FIG. 7 is a schematic illustration of a further embodiment hereof for forming bucket dovetails in accordance with the present invention.
Figure 8:
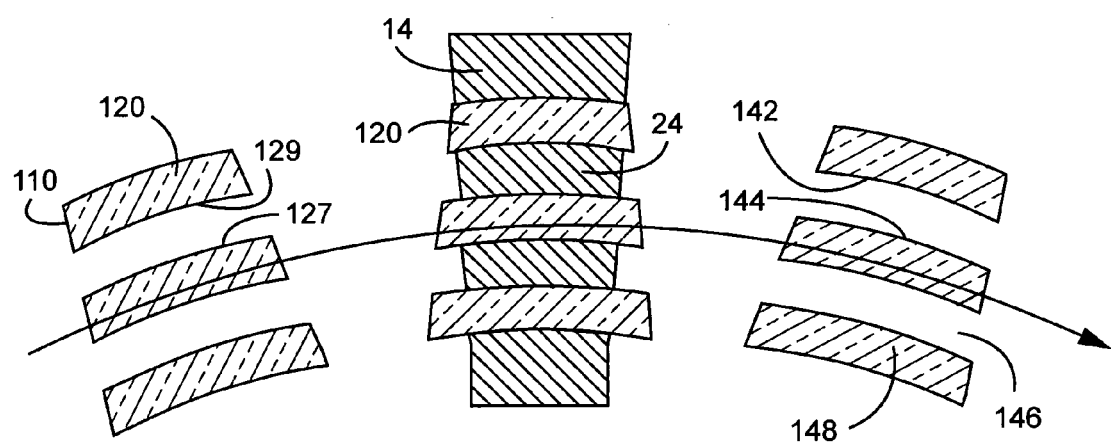
FIG. 8 is a schematic illustration illustrating movement of an electrode through a turbine bucket dovetail preform to form the bucket dovetails.

Referring now to FIGS. 7 and 8, there is illustrated a further embodiment of the present invention. In this embodiment, the hooks 120 and slots 122 on the electrode 110 have the identical negative configuration of the finished dovetail of the turbine bucket. Thus, as illustrated in FIG. 7, the hooks 120 have convex and concave surfaces 129 and 127, respectively, which form negatives for the arcuate surfaces 142 and 144 (FIG. 8) of the hooks of the finished dovetail. The preform 14 in this configuration is identical to the preform 14 of the embodiment illustrated in FIGS. 1–6. In this form, however, the electrode 110, upon submersion in the electrolytic bath 41, is passed through the preform slots 26 along the arc of a circle having a center coincident with a center of the arcs of the concave and convex surfaces 142 and 144 of the completed and finished dovetail. Thus, with the electrode 110 and preform 14 relatively movable about a common center with the linearly extending preform slots 26 lying perpendicular, i.e., tangent, to a radius from the common center, the electrode and preform are rotated relative to one another along the arc to pass the electrode 110 through the recess 12 of the bucket preform 14. In passing through the recess 12, the metal of the hooks 24 is burned, forming the opposing concave and convex surfaces 142 and 144, thereby forming finished arcuate slots 146 and hooks 148 for the bucket dovetail.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a dovetail on a bucket for a turbine comprising the steps of:
   (a) forming linearly extending, generally dovetail-shaped slots and hooks in a recess of a bucket dovetail preform;
   (b) providing an electrode having arcuate slots and hooks; and (c) relatively displacing the electrode and the preform to insert the hooks of the electrode into the slots of the preform and electromachining the preform upon electrical contact between the preform and electrode to provide arcuate-shaped hooks and slots along the bucket dovetail recess.

2. A method according to claim 1 including forming linearly extending slots and hooks along opposite sides of the bucket dovetail preform, providing the electrode with arcuate slots and hooks along opposite sides thereof, and locating the hooks of the electrode in the slots of the preform along opposite sides thereof and electromachining the opposite sides of the preform to provide arcuate-shaped hooks and slots along said opposite sides of the bucket dovetail recess.

3. A method according to claim 1 wherein step (b) includes providing an electrode with arcuately extending hooks of a height for reception in the linearly extending slots of the preform, relatively displacing the electrode and the preform in a linear direction corresponding to the linearly extending direction of the slots and hooks of the preform to locate the electrode hooks within the linearly extending slots of the preform and relatively displacing the electrode and preform in a direction normal to said linear direction to form concave and convex surfaces along respective opposite sides of adjacent linearly extending preform hooks.

4. A method according to claim 1 including the step of displacing the electrode and preform relative to one another along an arc of a circle such that the electrode hooks pass through the linearly extending slots of the preform to form arcuate hooks and slots in the preform in conformance to the arcuate slots and hooks of said electrode.

5. A method according to claim 1 wherein step (b) includes providing an electrode with arcuately-extending hooks of a maximum height in a radial direction equal to or less than the height of the linearly extending slots of the bucket preform.

6. A method according to claim 5 including relatively displacing the electrode and preform in a linear direction corresponding to the linearly extending direction of the slots and hooks of the preform to locate the electrode hooks within the linearly extending slots of the preform centrally of the width of the preform recess and relatively displacing the electrode and preform in a direction normal to said linear direction to form concave and convex surfaces along opposite sides, respectively, of adjacent linearly extending preform hooks.

7. A method according to claim 1 including providing the electrode with slots and hooks in a precisely negative configuration to the slots and hooks of the finished dovetail, and displacing the electrode and preform relative to one another along an arc of a circle such that the electrode hooks pass through the linearly extending slots of the preform to form arcuate hooks and slots in the preform in precise conformance to the arcuate slots and hooks of said electrode.

8. A method of forming a dovetail on a bucket for a turbine comprising the steps of:
(a) forming linearly extending, generally dovetail-shaped slots and hooks in a bucket dovetail preform;
(b) providing an electrode having an outer surface configuration comprised of arcuate hooks and slots in the form of a generally negative configuration of a finished dovetail on the turbine bucket; and
(c) relatively displacing the electrode and preform to insert the hooks of the electrode into the slots of the preform and electromachining the preform upon electrical contact between the preform and electrode to provide arcuate surfaces along the hooks on the bucket dovetail preform.

9. A method according to claim 8 wherein step (b) includes providing an electrode with arcuately extending hooks of a height for reception in the linearly extending slots of the bucket dovetail preform, displacing the electrode in a linear direction to locate the electrode hooks within the linearly extending slots of the preform, and relatively displacing the electrode and preform in a direction normal to said linear direction to form concave and convex surfaces along respective opposite sides of adjacent linearly extending preform hooks.

10. A method according to claim 8 including the step of displacing the electrode and preform relative to one another along an arc of a circle such that the electrode hooks pass through the linearly extending slots of the preform to form arcuate hooks and slots in the preform in general conformance with the arcuate slots and hooks of said electrode.

* * * * *